(12) United States Patent
Cam et al.

(10) Patent No.: US 6,680,954 B1
(45) Date of Patent: Jan. 20, 2004

(54) ATM INVERSE MULTIPLEXING SYSTEM

(75) Inventors: Richard Cam, Vancouver (CA); Steven Lang, Vancouver (CA); Charles Kevin Huscroft, Port Moody (CA)

(73) Assignee: PMC-Sierra, Ltd. (CA)

( * ) Notice: Subject to any disclaimer, the term of this patent is extended or adjusted under 35 U.S.C. 154(b) by 0 days.

(21) Appl. No.: 09/255,020

(22) Filed: Feb. 22, 1999

Related U.S. Application Data

(63) Continuation-in-part of application No. 08/764,490, filed on Dec. 12, 1996, now Pat. No. 5,875,192.

(51) Int. Cl.$^7$ ................................................. H04J 3/00
(52) U.S. Cl. ...................................... 370/474; 370/535
(58) Field of Search ............................... 370/395.1, 394, 370/474, 389, 535, 536, 398, 469, 505, 506, 537, 538, 473

(56) References Cited

U.S. PATENT DOCUMENTS

| | | | | |
|---|---|---|---|---|
| 5,343,468 A | * | 8/1994 | Rau | 370/395.41 |
| 5,608,733 A | * | 3/1997 | Vallee et al. | 370/394 |

FOREIGN PATENT DOCUMENTS

| | | | | |
|---|---|---|---|---|
| CH | WO 97/29613 | * | 8/1997 | H04Q/11/04 |

OTHER PUBLICATIONS

ATMF 95–1121. R. Vallee, "Baseline text for the Inverse Multiplexing for ATM (IMA) Specification", Dec. 1996.
ATMF 95–1659. R. Vallee, "Synchronous links, cell loss handling, and control cells in AIMUX", Dec. 1995.
ATMF 95–1144. "Potential Problems with Current AIMUX Baseline Text and Recommended Solutions", Oct. 1995.
ATMF 95–1684. R. Cam, "A Solution to the Error–Multiplication Problem for Cell–based AIMUX Systems", Dec. 1995.

* cited by examiner

*Primary Examiner*—Chi Pham
*Assistant Examiner*—Alexander O. Boakye
(74) *Attorney, Agent, or Firm*—Hall, Priddy, Myers & Vande Sande

(57) ABSTRACT

A method of reducing error-multiplication due to error events in a cell stream transmitted as a plurality of cell sub-streams which includes the steps of receiving an incoming cell stream in the form of an ordered sequence of cells including payload cells, transmitting the incoming cell stream in a round robin fashion on a plurality of physical links such that the ordered sequence of cells is transmitted as a plurality of cell sub-streams, with each cell sub-stream having a multiplexed set of cells from the incoming cell stream, and inserting stuff (st) cells into the cell sub-streams so as to form continuous streams of data. Sequence number cells which are inserted periodically into each cell sub-stream, are used to align the cell sub-streams in frames. Sets of cell location information for the cell sub-streams are encoded and contain the location of payload cells and st cells located within a corresponding cell sub-stream. The sets of cell location information are passed on to a receiving end where they are re-constructed at the receiving end. A sequence of the ordered sequence of cells from the cell sub-streams is re-constructed including decoding the sets of cell location information to identify and locate errored cells and missing cells within the cell sub-streams and demultiplexing and releasing error-free payload cells from the cell sub-streams.

53 Claims, 7 Drawing Sheets

ATM INVERSE MULTIPLEXING SYSTEM

This application is a continuation-in-part of application Ser. No. 08/764,490 filed Dec. 12, 1996 now 5,875,192.

FIELD

The present invention relates to a cell-based ATM Inverse Multiplexing System which reduces the incidence of error-multiplication due to error events in the transmitted cell stream.

BACKGROUND

In an ATM Inverse Multiplexing System (formerly referred to as AIMUX but presently referred to as IMA, for Inverse Multiplexing for ATM), ATM cell traffic is transported by means of time-division multiplexing over several channels (typically T1 or E1 data links). In a cell based IMA system, these ATM cells (defined here as "payload cells") are sent on each channel in a round-robin fashion as depicted in FIG. 1. In FIG. 1, an incoming cell stream from an ATM layer on bus interface 21 is received by IMA device 11 of IMA system 10 and is coupled to another IMA device 12 by three channels or links 14, 16, and 18. Incoming cells 20 on incoming bus interface 21 enter the IMA device 11 and are time-division multiplexed over links 14, 16, and 18. In each channel or link 14, 16, or 18, a sequence number "S" cell is inserted periodically, as determined by a specified time interval or by a given number of cells. In this case an "S" cell precedes each series of cells from the incoming cell stream over a selected time interval or for each of a selected number of incoming cells. Another "S" cell is inserted on each channel after the last cells of the given set of cells in the incoming cell stream has been transmitted. At the IMA device 12, the egress payload cell stream is reconstructed by assembling incoming cells on each channel in the same order as they were transmitted.

A more specific configuration is shown in FIG. 2, in which one ATM Layer Device 18 is coupled through an IMA system 10 to another ATM Layer Device 19. The ATM Layer Device 18 connects to IMA device 11 via Utopia/SCI-PHY bus interface 21 which, in turn, is coupled to a number of physical layer devices 30 by Utopia/SCI-PHY bus interface 14. Each physical layer (PHY-layer) device 30 is coupled by links 34 and 36 to another corresponding physical layer device 32. Each physical layer device 32 is connected to IMA device 12 by one of several Utopia/SCI-PHY bus interface 16. IMA device 12 connects to ATM Layer device 19 by Utopia/SCI-PHY bus line 22.

Cells from ATM Layer Device 18 are sent to IMA device 11 which multiplexes them together with "S" cells, onto bus lines 14. A transmitting PHY-layer ATM device 30 sends idle cells over its link for the purpose of cell rate decoupling whenever its transmit FIFO-buffer (not shown) is empty. This can occur when the incoming ATM traffic is either bursty or if the cells arrive at a rate slower than the transmit rate of the PHY device 30.

The receiving IMA device 12 must reconstruct its output stream from cells received over the constituent channels, in such a way that cell sequence integrity is preserved. Referring to FIG. 3, an input cell stream 13 is multiplexed over three links 15 (link #1), 17 (link #2), and 19 (link #3). An S cell precedes cell #1 followed by cell #1. Similarly, an S cell precedes cell #2 followed by an idle cell containing an error (error(2)) and an S cell on link 19 is followed by cell #3. The remaining cells are sent in the order shown in FIG. 3 with cells #4 and #8 containing errors (error(1) and error(3), respectively). Suppose a payload (or S) cell is lost due to an HEC error, as shown in FIG. 3 (event error (1)). If the cells are simply reassembled directly according to the successfully received payload cell sequence in each channel or link, then the output cells will no longer be delivered in the correct sequence to the ATM-layer device 12, as can be seen in FIG. 4. These errors will not be detected until an S cell is subsequently received (error-free), at which point the IMA device will realize the problem because the number of payload cells received between that and the previous S cell will be different from what is expected.

It will be seen that mis-sequencing occurs from a combination of 1)idle cells inserted in a manner that disrupts the ordered arrival sequence of payload cells and, 2) ambiguities as to where these idle cells may be in the received cell stream (and guessing wrong). These are consequences of using channels that operate in an asynchronous manner, where each channel may be operating at slightly (but nevertheless significantly) different frequencies and phase differences relative to the other channels at any given time. The mis-sequencing problem can be solved by having the channels operate synchronously with each other, but that may not always be feasible as it depends very much on the underlying telephone network infrastructure.

ATM PHY devices 32 are typically configured to discard idle cells and cells with HEC errors. If these devices can be programmed to pass HEC-errored cells on to the higher layers, additional information can be used to assist in the decoding process (see ATMF 95-1659, "Synchronous Links, Cell Loss Handling, and Control Cells in AIMUX", December 1995). However, the IMA device 12 will still need to guess whether or not a HEC-errored cell corresponds to an idle cell. Now suppose that the number of payload cells framed between two S cells is fixed. The IMA device 12 can now use this information to identify errored cells by buffering all subsequently received cells for the remainder of the frame, and count the number of payload cells (see ATMF 95-1659, supra.). If the number of payload cells is less than expected, then it may be possible to determine the position of any missing payload cell by determining the locations of the HEC-errored cells. Furthermore, cell arrival timing information can be used to reduce the range of possibilities. This can be done by either explicitly recording the arrival times or by having the PHY devices pass idle cells through. Even if all these measures are taken, certain error patterns can produce unresolved ambiguities that lead to error multiplication. An example is shown in FIG. 3 for events error (2) and error (3), where the corresponding decoded sequence is shown in FIG. 5. Moreover, buffering schemes such as this one will not work if the number of payload cells in a given frame is unknown.

Accordingly, it is an object of the invention to provide a more robust solution to reduce error multiplication, as compared to the known schemes. It is a further object of the invention to provide error free multiplication which does not require additional PHY-layer signaling information from known schemes which work over asynchronous multiplexed channels. It is yet a further object of the invention to provide a solution to reduce error multiplication with no additional transmission overhead compared to existing schemes and which does not require an inordinate increase in implementation complexity or memory requirement.

SUMMARY OF THE INVENTION

According to the invention there is provided a method of reducing error-multiplication due to error events in a cell stream transmitted as a plurality of cell sub-streams which includes the steps of receiving an incoming cell stream in the form of an ordered sequence of cells including payload cells, transmitting the incoming cell stream in a round robin fashion on a plurality of physical links such that the ordered sequence of cells is transmitted as a plurality of cell sub-streams, with each cell sub-stream having a multiplexed set of cells from the incoming cell stream, and inserting stuff (st) cells into the cell sub-streams so as to form continuous streams of data. Sequence number (S) cells which are inserted periodically into each cell sub-stream, are used to align the cell sub-streams in frames. Sets of cell location information for the cell sub-streams are encoded and contain the location of payload cells and st cells located within a corresponding cell sub-stream. The sets of cell location information are passed on to a receiving end where they are re-constructed at the receiving end. A sequence of the ordered sequence of cells from the cell sub-streams is re-constructed including decoding the sets of cell location information to identify and locate errored cells and missing cells within the cell sub-streams and demultiplexing and releasing error-free payload cells from the cell sub-streams.

The sets of cell location information may be encoded into transmitted framing cells inserted in the cell sub-streams.

The transmitted framing cells may be transmitted after transmitting cell sub-streams corresponding to the sets of cell location information. Here both st and S cells are referred to as framing cells.

The transmitted framing cells may be transmitted before transmitting cell sub-streams corresponding to the sets of cell location information.

Preferably, the sets of cell location information are inserted in overhead cells for transmission to receiving end.

The errored cells may be marked as errored using available space within said errored cells.

BRIEF DESCRIPTION OF THE DRAWINGS

The novel features believed characteristic of the invention are set forth in the appended claims. The invention itself, as well as other features and advantages thereof, will be best understood by reference to the description which follows read in conjunction with the accompanying drawings, wherein:

DETAILED DESCRIPTION WITH REFERENCE TO THE DRAWINGS

Figure 1:
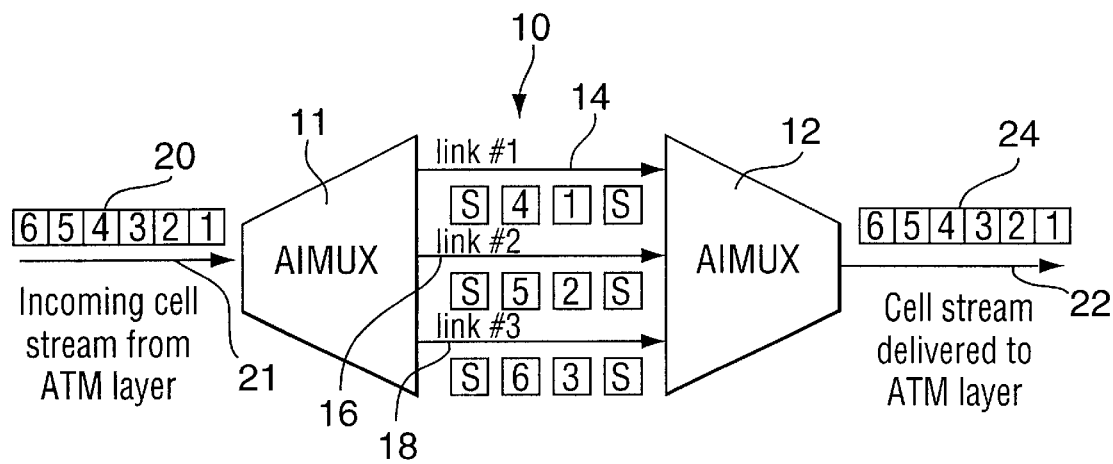
FIG. 1 is a schematic diagram of an IMA system with three links demonstrating the round-robin transmission of ATM cells.
Figure 2:
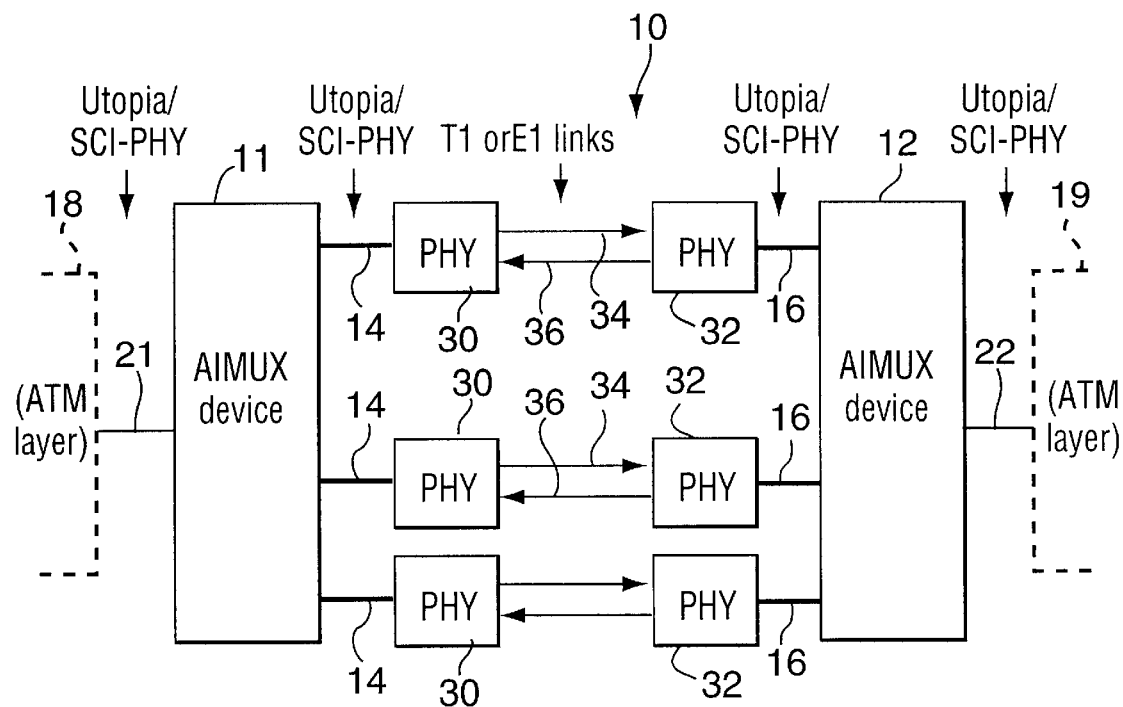
FIG. 2 is a more detailed block diagram of the system of FIG. 1.

In the following description, the terminology and assumptions used are based largely on the baseline text described in ATMF 95-1121, R. Vallee, G. Wetzel, "Baseline text for ATM Inverse Multiplexing Specification", October 95 incorporated herein by reference. However, the scheme is flexible enough to accommodate proposed changes such as those indicated in ATMF 95-1144, "Potential Problems with Current AIMUX Baseline Text and Recommended Solutions", October 1995, as well as subsequent versions of the baseline text. In the following, a frame refers to a set of cells, on one channel, containing a sequence number (S) cell and all subsequent cells before the next S cell. Payload cells refer to ATM cell traffic to be transported over the. IMA system, excluding additional cells inserted by the IMA system 10 itself.

The approach of this scheme is accomplished employing the following steps:

(1) Preventing the (arbitrary) insertion of idle cells at the transmit side of the IMA system independently of control by the transmitting side by having the IMA device insert stuff (st) cells (see ATMF 95-1684, R. Cam, "A Solution to the Error-Multiplication Problem for Cell-Based AIMUX Systems," December '95) for cell rate decoupling.

(2) Recording where stuff and S cells have been inserted in the multiplexed cell streams.

(3) Passing the location information for these cells on to the receiver side.

(4) Allowing the receiver to use this information to release the (error-free) payload cells in the correct sequence.

To prevent insertion of idle cells, the transmit FIFOs (not shown) of the PHY devices 30 and 32 must not be allowed to empty out since such an event would trigger transmission of idle cells. To meet this requirement, the IMA device 11 and 12 sends out operation and management type (OAM-type) stuff cells during intervals when idle cells would otherwise be generated for cell rate decoupling. In general, the IMA device 11 and 12 sends to the PHY devices 30 and 32 while monitoring the TCA (Transmit Cell Available) signal of each device such that their transmit FIFOs never overflow but always remain at least partially filled. Hence, the cell stream of each transmitting PHY device 30 can be characterized as in ATMF 95-1121, supra., along with stuff cells inserted when necessary for cell rate decoupling. Insertion of stuff cells forms only part of the solution since the receiving end may not be able to distinguish whether or not a cell received in error is a stuff cell. The next key step is to send detailed location information of stuff and control cells in the transmitted cell stream on to the receiving end.

For convenience, both stuff (st) and S cells are collectively referred to as framing cells. For all practical purposes st and S cells are essentially identical and differ primarily in the reason for their insertion. Each framing cell contains location information of both control and payload cells in a window of time into the past for each channel in the given link group, relative to the particular framing cell. The size of this window will of course depend on the space allocated to contain this information. Stuff and S cells have the same format and field for location information. They can contain not only stuff location information but also the latest status information.

Framing cells have a field ("SCCI", or status and control change indication field in the IMA standard) that is incremented only when there is a change in any of the status information fields. This allows a receiver implementation to quickly determine if the status fields in the framing cells have changed since the last one received over the same link, potentially saving the receiver from having to scan every status field. This scheme is robust against errors in the communications channel since many consecutive errors on successive framing cells would have to occur before the SCCI field wraps around to the starting value.

Looking at the present baseline text for cell-based IMA, it appears that octet 12–51 in each S cell, which are currently unused, can be allocated for the purpose of encoding framing cell location information. As an example, consider the simple case of straight binary coding without supplemental error protection, where a "0" indicates a data cell and a "1" indicates a framing cell. If all 40 bytes are used, then information for up to 40×8=320 cell slots can be stored.

Figure 6:
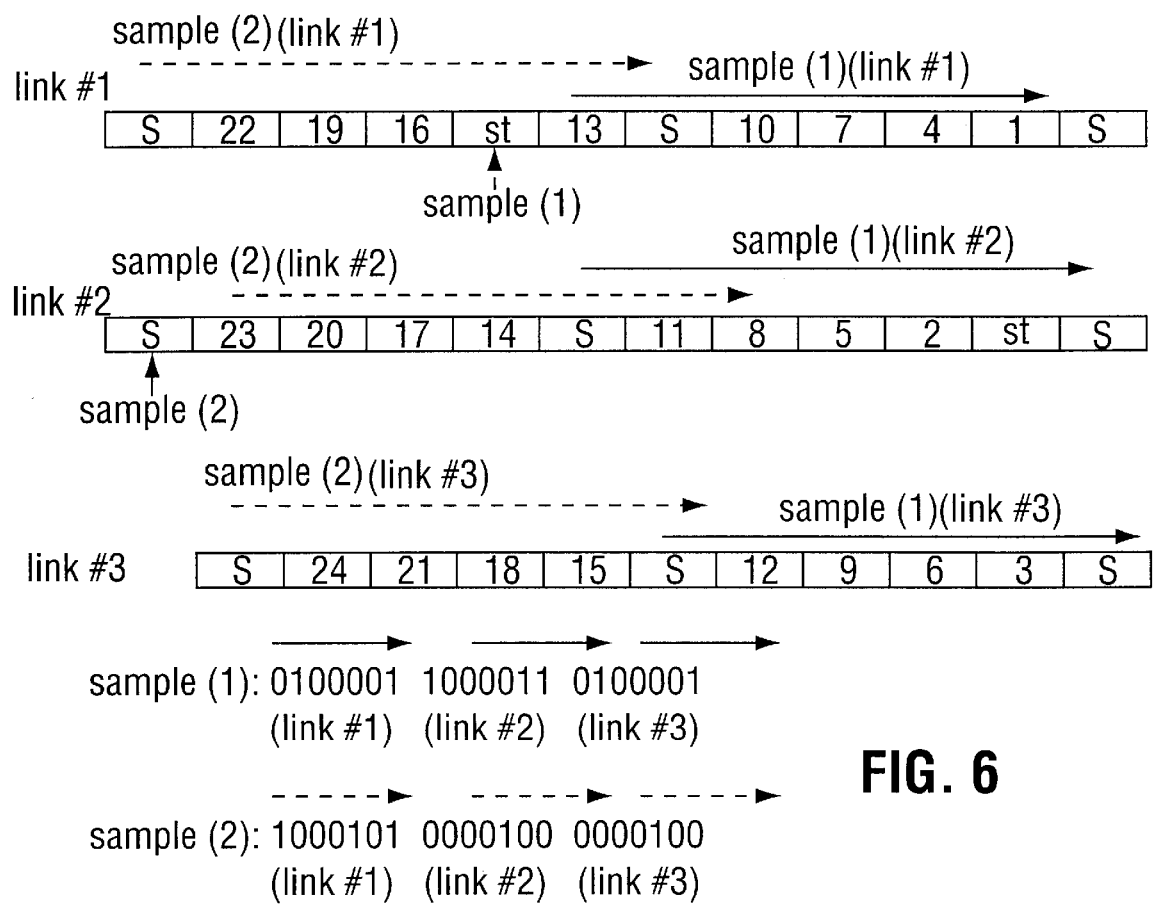
FIG. 6 is a schematic diagram of location information coding for sample cell sequence fragments.

Two sample encodings are shown in FIG. 6 for the given cell sequence fragment, assuming location information for the last 7 cells sent over each link. Suppose that the round-robin sequence among the links is 1, 2, 3, 1, 2, 3, . . . In the case of sample (1), location information stored in the indicated stuff cell consists of the most recent 7-cell history encoding in link #1 (i.e., starting from payload cell 13), followed by link #2 starting from the S cell, and link #3 starting from payload cell 15. Hence, the complete encoding is formed by concatenating all three link-specific encodings in the order of links #1, 2 and 3 (i.e., "0100001", "1000011", and "0100001"). Note that the convention for concatenation is assumed to be in increasing numerical order starting from 1. For sample (2), it is assumed that payload cell 24 and an S cell were the last cells sent in links #3 and #1, respectively, prior to transmission of the indicated S cell. Hence, the complete encoding is the concatenation of "1000101", "0000100", and "0000100", corresponding to links 1 through 3. Since the number of links and the history interval for each link are set up ahead of time by the IMA protocol, there is no ambiguity as to how the link-specific information is to be extracted.

Note that the information in a given framing cell's window can partially overlap with those contained in one or more preceding (framing) cells. This is desirable since it results in additional redundancy in case framing cells are lost. Of course other schemes can be used to code the location information, including those in which there is no overlap.

It is still necessary to distinguish between stuff (st) and S cells, since the payload cell stream is recovered by aligning the S cells at the receiver. This can be accomplished within the current S cell format by using any one of the unused bits in the TXCTRL field.

Figure 3:
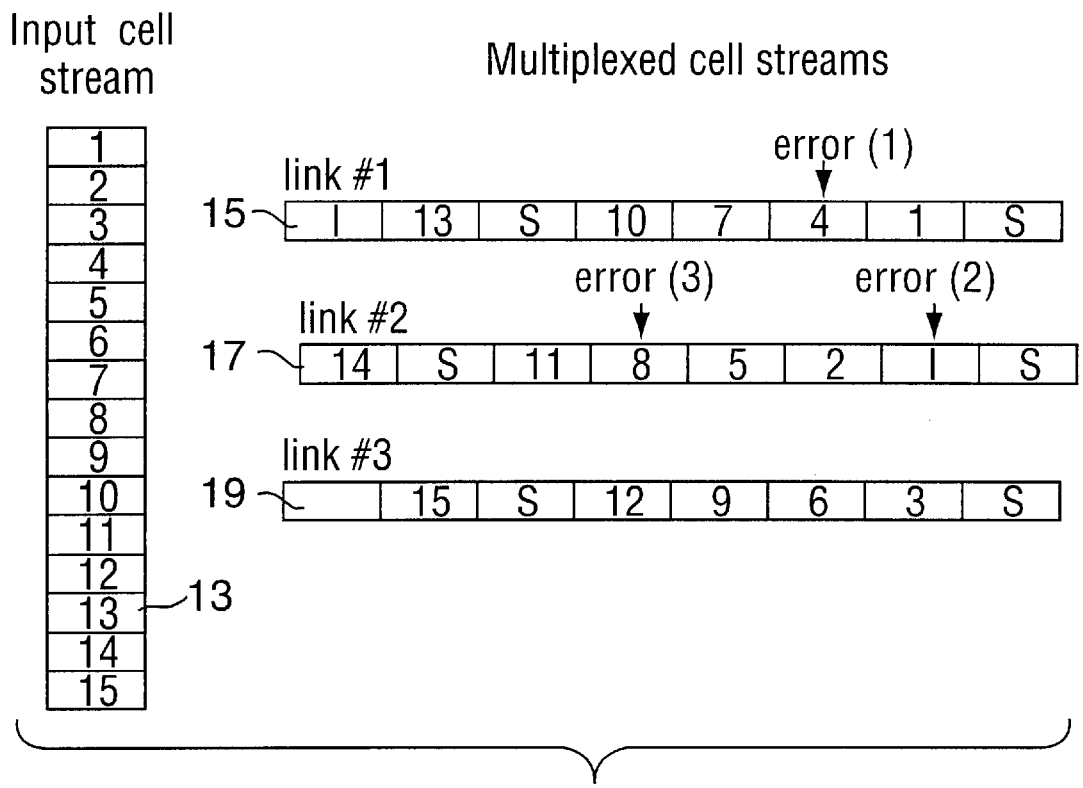
FIG. 3 is a schematic diagram of input and multiplexed cell streams with sample locations of HEC-errored cells.
Figure 4:
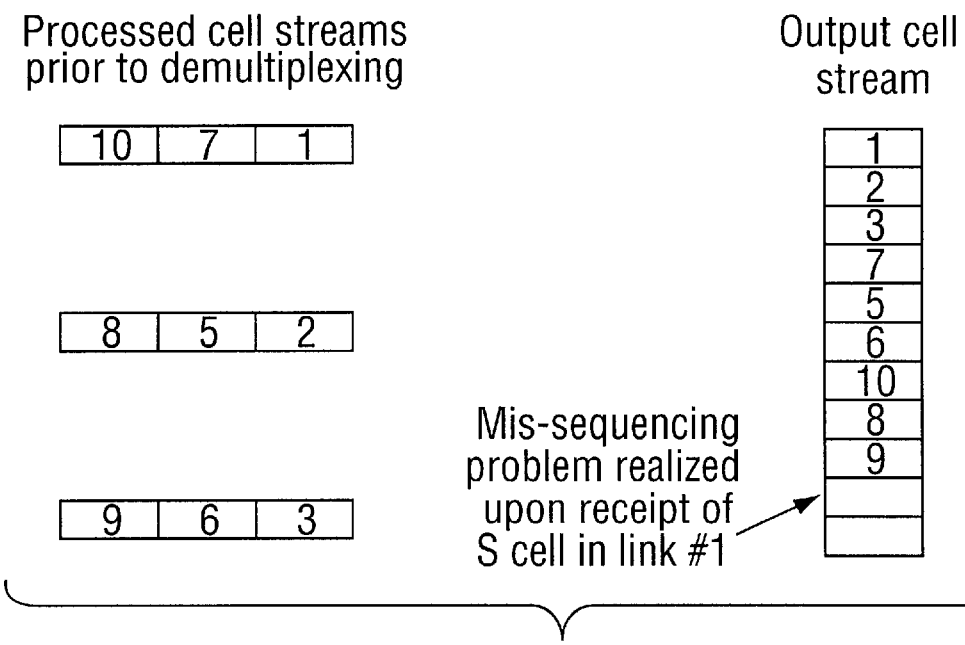
FIG. 4 is a schematic diagram of the occurrence of error multiplication corresponding to event error(1) of FIG. 3.
Figure 5:
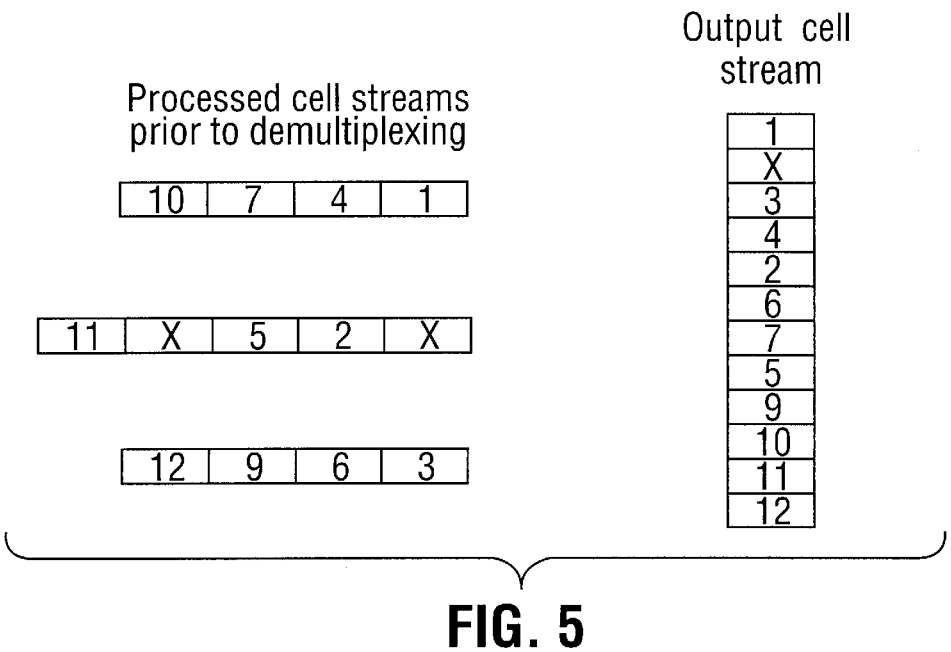
FIG. 5 is a schematic diagram of an error multiplication event corresponding to a combination of error(2) and error (3) of FIG. 3 (for the case of buffering with information about HEC-errored cells and cell arrival times)
Figure 7:
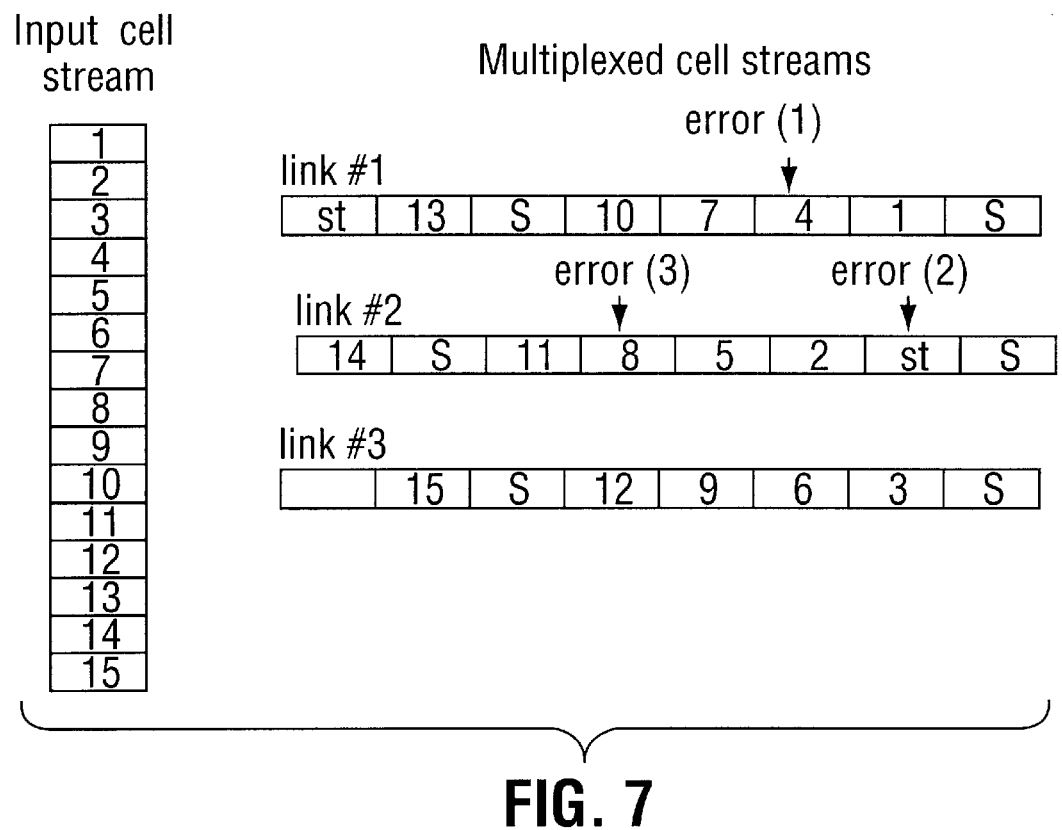
FIG. 7 is a schematic diagram of input and multiplexed cell streams with stuff cell insertion and sample locations of HEC-errored cells.
Figure 8:
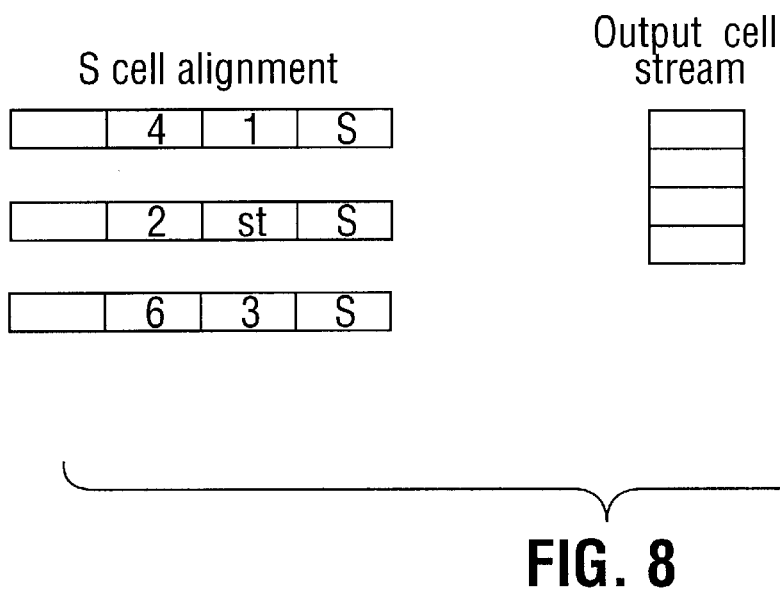
FIG. 8 is a schematic diagram of S cell alignment and initial buffering.
Figure 9:
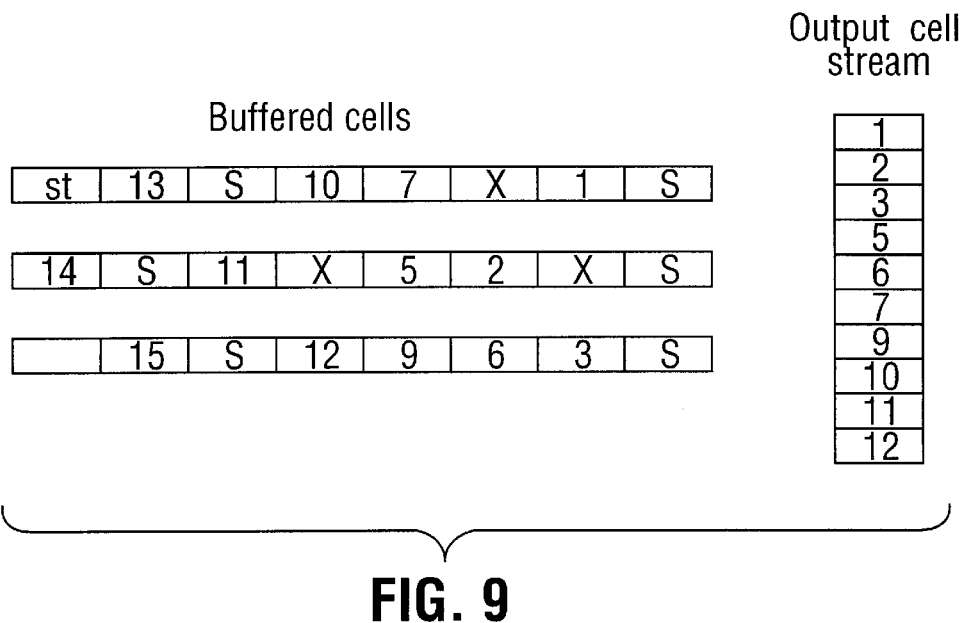
FIG. 9 is a schematic diagram showing the buffering and subsequent release of received cells.

Consider the cell streams in FIG. 7 with HEC error events occurring as shown. This is FIG. 3 redrawn to show stuff cells inserted in place of idle cells. At the receiving end, the IMA device 12 demultiplexes the cell streams by aligning the S cells and releasing the payload cells in such a way the buffer is kept partially filled as much of the time as possible (FIGS. 8 and 9). This is to reduce cell delay variation (CDV), though at the expense of additional cell transfer delay (CTD). When an errored cell is detected, the IMA device 12 will continue to buffer subsequent cell arrivals. Whenever a framing cell is received, the IMA device 12 examines the location information to determine which of the errored or missing cells correspond to payload cells. Payload cells can be released according to the demultiplexing sequence as well as traffic shaping requirements, so long as they are not preceded by an unresolved errored or missing cell. Missing or errored payload cells are replaced by a st cell, or simply skipped over (FIG. 9). In either case, cell sequence integrity is preserved. So long as a cell remains unresolved, subsequent cells in the same frame cannot be released.

One way to implement this buffering scheme is to allocate a fixed-size block of B cells for each channel in the link group, and to use each block as a circular buffer. Associated with each block are the following parameters:

(1) A write pointer 40 (see FIG. 10) that points to the location for storing the next buffered cell. This pointer is incremented each time after a cell is stored into the buffer.

(2) A read pointer 42 that points to the location of the oldest remaining cell stored in the buffer. It is initialized to point to the same location as the write pointer 40. This pointer 42 is incremented each time a cell is released from the buffer (as defined below).

(3) A total cells (TC) counter 44, initialized to zero, that is incremented or decremented each time the write 40 or read 42 pointer is incremented, respectively.

Figure 10:
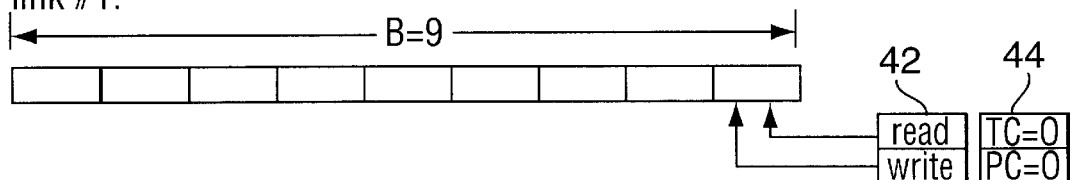
FIG. 10 is a schematic diagram of the initialized data structure of the link buffers.
Figure 10:
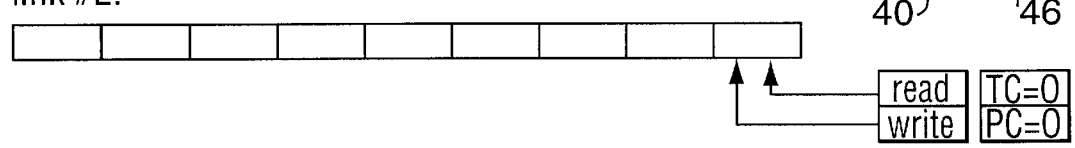
Figure 10:
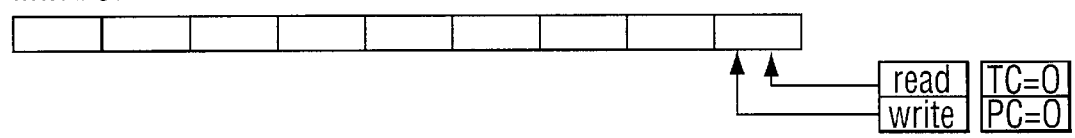

(4) A payload cells (PC) counter 46, initialized to zero, that is incremented or decremented each time a payload cell is stored or released, respectively. The PC counter 46 is also incremented each time an unresolved cell is identified (through the location information) as a payload cell. The diagram of this data structure is shown in FIG. 10 after initialization.

Figure 11:
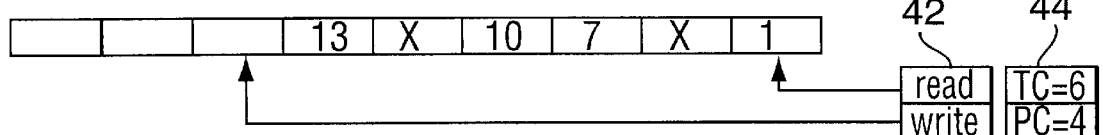
FIG. 11 is a schematic diagram of the status of the link buffers after arrival of several cells where X denotes errored or HEC-errored cells.
Figure 11:
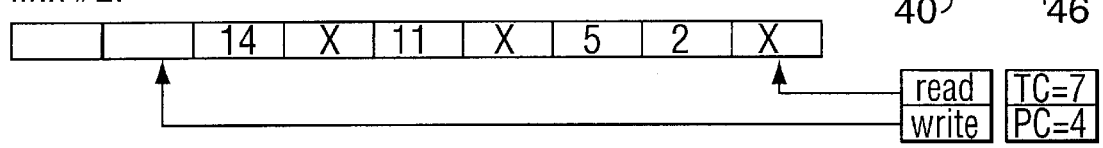
Figure 11:
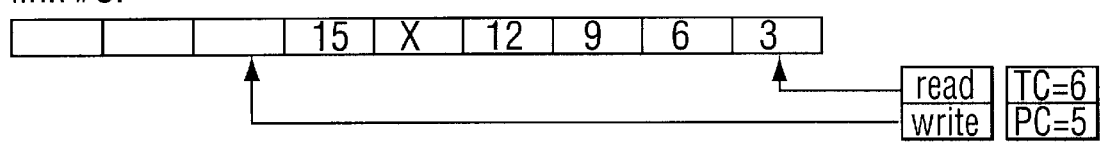
Figure 12:
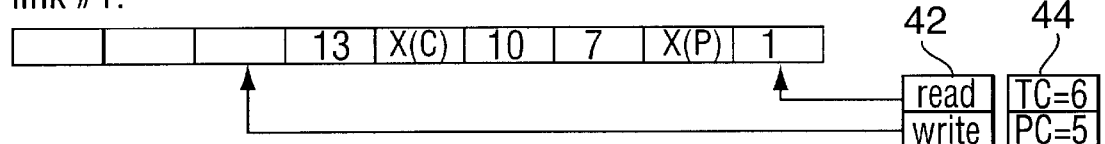
FIG. 12 is a schematic diagram of FIG. 11 after updating the link buffers after receipt of an st or S cell where X(C) and X(P) indicate identification of errored control and payload cells, respectively.
Figure 12:
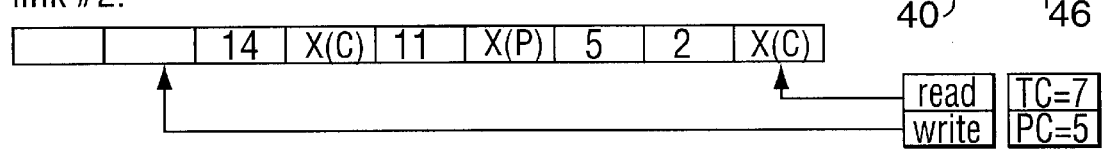
Figure 12:
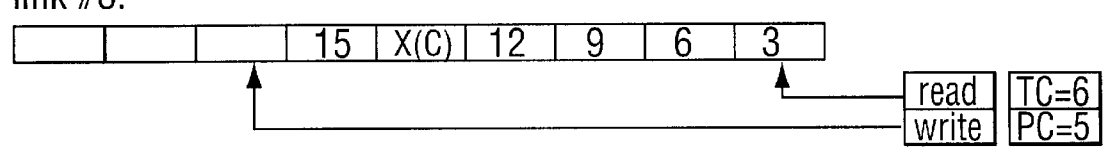
Figure 13:
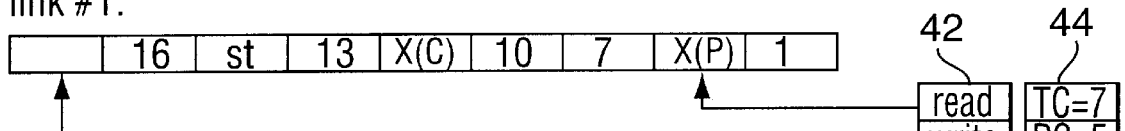
FIG. 13 is a schematic diagram showing the status of the link buffers, read and write pointers and TC and PC counters after arrival of new cells and release of buffered cells.
Figure 13:
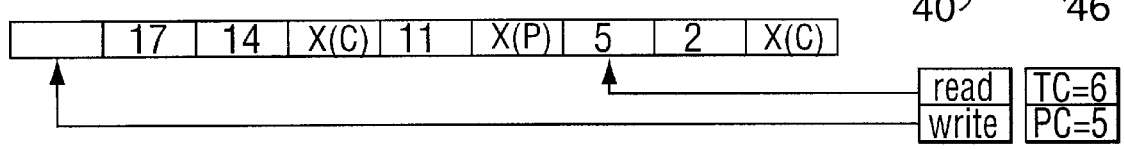
Figure 13:
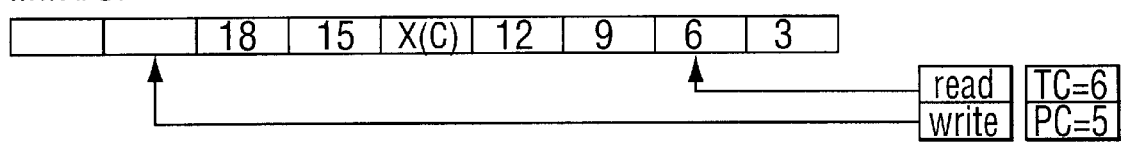

The IMA receiver 12 operates as follows. First, the read 42 and write 40 pointers, as well as the TC 44 and PC 46 counters are initialized as described above. These parameters change to reflect the buffer status as cells arrive (see FIG. 11 in which the sequence in FIG. 7 is used as an example). Initially, the IMA receiver 12 allows the buffer to fill before releasing cells at a point determined by the TC 44 and/or PC 46 counters of each channel. These counters are used in determining how cells are subsequently released so as to achieve the desired compromise between cell delay variation (CDV) and cell transfer delay (CTD). When a framing cell is successfully received, the location information is extracted to identify the errored or missing cells and to update the corresponding PC counters 46 (see FIG. 12). One way to mark these identified cells is to use some of the presently unused bits in the position of the transmit control (TXCTRL) field to indicate if the missing cell is "unknown", "errored payload" (i.e., st), or "errored control" (i.e., S). FIG. 13 shows a "snapshot" of the buffer as cells are written in and released.

Once (errored) framing cells have been identified, the location information contained in these cells may be used to identify cells received further back into the past. This is because the payloads of these cells may be error-free even though their headers are in error. In order to distinguish between errors in the header and the payload, one calculates the CRC-10 over octets 7 through 51 of a S (framing) cell.

Alternatively, one can specify a separate coding scheme altogether for error detection and even error correction of the location information.

The receiver 12 releases cells according to the demultiplexing sequence until forced to pause upon encountering a link buffer that is either empty or blocked by an unresolved cell. Payload cells without errors are passed on to the ATM-layer device 19. An error-multiplication event occurs when a TC count exceeds buffer size B or when an "unknown" cell cannot be identified. This event should occur only very rarely, but when it does occur, all cells in the same frame in each channel are flushed from the buffers.

The above scheme is a preferred one for reducing the incidence of error multiplication. However, the location information may be encoded and stored in other IMA overhead cells which are sent to the receiving end. By this procedure the receiver can be assisted in correctly demultiplexing the payload cell stream (thus avoiding error multiplication) without requiring additional transmission bandwidth.

Using the above scheme, transmissions of location information transmitted over multiplexed bursty channels can be made less sensitive to error bursts by transmitting redundant information among other constituent channels. This approach is useful if bursts with high bit error rates tend to occur over a relatively long interval and if the bursts tend to be uncorrelated among the given channels. If bursts can render a given channel unusable for unacceptably long periods of time, then using other multiplexed channels (that tend not to be affected simultaneously) may be a better alternative to using more error protection coding or time diversity over a single channel.

One variation is to have the transmit side include the location information of cells coming after the stuff or sequence number cell containing the given location information. This could be done by using a buffer at the transmit side to temporarily hold the cells and generate the location information. Such a buffer may also be used (or required anyway) for traffic shaping purposes. Since the location information now pertains to cells arriving afterwards (i.e., in the future), a buffer will not be required at the receiver 12 for holding the cells prior to decoding location information (as in the above description), although some form of buffering may be needed for other purposes such as smoothing the released cell stream in order to reduce cell delay variation (CDV). At the receiver, a table for storing continually updated location information will still be needed, however.

Another variation has the transmit side encoding the location information of cells sent before and cells to be sent after the stuff or sequence number cell containing the given location information. This approach requires buffering at both the transmitter and receiver. The bi-directional nature of the location information may allow for some flexibility in provisioning transmit and receive buffers closer to sizes required for ancillary purposes such as traffic shaping and CDV smoothing. For example, rather than using the scheme described above with a receive buffer large enough to contain two frames for each link, an alternative design could use the variation here along with transmit and receive buffers that can each store one frame for each link. It may achieve a comparable level of robustness and may provide a closer match to the sizes required anyway for traffic shaping and CDV smoothing.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modification or embodiments as fall within the true scope of the invention.

What is claimed is:

1. A method of reducing error-multiplication due to error events in a cell stream transmitted as a plurality of cell sub-streams in an inverse multiplexing system whose actions include:
   receiving an incoming cell stream comprising an ordered sequence of cells including payload cells;
   transmitting the incoming cell stream in a round robin fashion on a plurality of physical links such that the ordered sequence of cells is transmitted as a plurality of cell sub-streams, each cell sub-stream comprising a multiplexed set of cells from said incoming cell stream;
   inserting stuff (st) cells into said cell sub-streams so as to form continuous streams of data;
   inserting sequence number (S) cells periodically into each cell sub-stream, wherein said S cells are used to align said cell sub-streams in frames; and
   re-constructing at the receiving end a sequence of said ordered sequence of cells from said cell sub-streams, the method comprising the steps of:
      encoding sets of cell location information for the cell sub-streams, each of said sets of cell location information comprising the location of payload cells and st cells located within a corresponding cell sub-stream;
      passing said sets of cell location information to a receiving end; and
      decoding the sets of cell location information to identify and locate errored cells and missing cells within the cell sub-streams and demultiplexing and releasing error-free payload cells from the cell sub-streams.

2. A method according to claim 1, wherein said sets of cell location information are encoded into transmitted framing cells inserted in said cell sub-streams.

3. A method according to claim 2, wherein said transmitted framing cells are transmitted after transmitting cell sub-streams corresponding to said sets of cell location information.

4. A method according to claim 2, wherein said transmitted framing cells are transmitted before transmitting cell sub-streams corresponding to said sets of cell location information.

5. A method according to claim 2, wherein said transmitted framing cells are transmitted before and after transmitting cell sub-streams corresponding to said sets of cell location information.

6. A method according to claim 2, wherein said pre-selected cells are selected from at least one of: (a) said S cells and (b) said st cells.

7. A method according to claim 6, wherein said st cells are inserted into said cell sub-streams during intervals when idle cells would otherwise be inserted into said cell sub-streams for cell rate decoupling.

8. A method according to claim 7, including marking errored cells within said cell sub-streams.

9. A method according to claim 8, wherein said re-constructing step includes distinguishing between header errors and payload errors in said pre-selected cells so that cell location information stored in an errored pre-selected cell having an error-free payload may continue to be used to reconstruct the sequence of said ordered sequence of cells.

10. A method according to claim 2, wherein said re-constructing step includes distinguishing between header errors and payload errors in said pre-selected cells so that cell location information stored in an errored pre-selected cell having an error-free payload may continue to be used to reconstruct the sequence of said ordered sequence of cells.

11. A method according to claim 10, wherein said pre-selected cells are transmitted after transmitting cell sub-streams corresponding to said sets of cell location information.

12. A method according to claim 10, wherein said pre-selected cells are transmitted before transmitting cell sub-streams corresponding to said sets of cell location information.

13. A method according to claim 2, wherein said pre-selected cells contain sets of cell location information for both cell sub-streams transmitted before said pre-selected cells and cell sub-streams transmitted after said pre-selected cells.

14. A method according to claim 2, wherein said re-constructing step includes storing cells from said cell sub-streams in a buffer.

15. A method according to claim 14, wherein said re-constructing step includes releasing cells stored in said buffer at a rate sufficient to maintain a predetermined number of stored cells within said buffer.

16. A method according to claim 15, wherein said re-constructing step includes flushing all cells aligned in the same frame for all cell sub-streams upon failure to identify an unknown cell within at least one such frame.

17. A method according to claim 1, wherein said sets of cell location information are inserted in framing cells for transmission to said receiving end.

18. A method according to claim 1, wherein said sets of cell location information are inserted in to available space within transmitted st cells.

19. A method according to claim 1, wherein said st cells are inserted into said cell sub-streams during intervals when idle cells would otherwise be inserted into said cell sub-streams for cell rate decoupling.

20. A method according to claim 1, wherein errored cells in said incoming cell stream are replaced with pre-selected cells for transmission in said cell sub-streams.

21. A method according to claim 1, including marking errored cells within said cell sub-streams.

22. A method according to claim 21, wherein said errored cells are marked as errored using available space within said errored cells.

23. A method according to claim 1, including distinguishing between an error in a header and an error in a payload of a transmitted framing cell so that cell location information stored in an errored framing cell with an error-free payload may continue to be used to re-construct the sequence of said ordered sequence of cells.

24. A method according to claim 1, where said framing cells all have identical format and fields for location information.

25. A method according to claim 1, wherein said framing cells all contain stuff location and latest status information.

26. A method according to claim 1, wherein said framing cells have a status and control change indication field that is incremented only when there is a change in any status information field which allows a receiver implementation to quickly determine if the status fields in the framing cells have changed since the last one received over the same link.

27. A method according to claim 1, wherein said sets of cell location information are inserted into framing cells at least one frame before frames for ones of said cell sub-streams corresponding to said sets of cell location information.

28. A method according to claim 1, wherein said sets of cell location information are inserted in to framing cells at least one frame after frames for ones of said cell sub-streams corresponding to said sets of cell location information.

29. A method according to claim 1, wherein said sets of cell location information are inserted only into corresponding ones of said cell sub-streams.

30. A method according to claim 1, wherein cell location information is stored in a transmitted framing cell so as to overlap with cell location information stored in another transmitted framing cell.

31. A method according to claim 30, wherein errored cells in said incoming cell stream are replaced with st cells for transmission in said cell sub-streams.

32. A method according to claim 1, including transmitting redundant cell location information over more than one of said physical links.

33. A cell-based system for reducing error-multiplication due to error events in a cell stream transmitted as a plurality of cell sub-streams, the system comprising:
(a) a first assembly coupled to a plurality of links and an incoming cell stream comprising an ordered sequence of cells including payload cells;
(b) a second assembly coupled to the plurality of links; wherein said first assembly comprises:
means for encoding and transmitting sets of cell location information for said cell sub-streams, each of said sets of cell location information comprising the location of payload cells and framing cells located within a corresponding cell sub-stream;
and wherein said second assembly comprises:
means for receiving said sets of cell location information; and
means for re-constructing a sequence of said ordered sequence of cells from said cell sub-streams robustly, by means for decoding said sets of cell location information to identify and locate errored cells and missing cells within said cell sub-streams and means for demultiplexing and releasing error-free payload cells from the cell sub-streams.

34. A system according to claim 33, wherein said first assembly includes means for inserting said sets of cell location information into pre-selected cells inserted in said cell sub-streams.

35. A system according to claim 34, wherein said pre-selected cells are selected from at least one of: (a) said S cells and (b) said st cells.

36. A system according to claim 35, wherein said means for inserting st cells includes means for inserting said st cells into said cell sub-streams during intervals when idle cells would otherwise be inserted into said cell sub-streams for cell rate decoupling.

37. A system according to claim 36, wherein said first assembly includes means for storing cell location information in a transmitted framing cell so as to overlap with cell location information stored in another transmitted framing cell.

38. A system according to claim 34, wherein said second assembly includes means for distinguishing between header errors and payload errors in said pre-selected cells so that cell location information stored in an errored pre-selected cell having an error-free payload may continue to be used to reconstruct the sequence of said ordered sequence of cells.

39. A system according to claim 35, wherein said second assembly includes means for distinguishing between header errors and payload errors in said pre-selected cells so that cell location information stored in an errored pre-selected cell having an error-free payload may continue to be used to reconstruct the sequence of said ordered sequence of cells.

40. A system according to claim 39, wherein said means for transmitting the incoming cell stream in a round robin fashion on the links includes means for transmitting said pre-selected cells after transmitting cell sub-streams corresponding to said sets of cell location information.

41. A system according to claim 39, wherein said means for transmitting the incoming cell stream in a round robin fashion on the links includes means for transmitting said pre-selected cells before transmitting cell sub-streams corresponding to said sets of cell location information.

42. A system according to claim 34, wherein said first assembly includes means for inserting into said pre-selected cells sets of cell location information for both cell sub-streams transmitted before said pre-selected cells and cell sub-streams transmitted after said pre-selected cells.

43. A system according to claim 34, wherein said second assembly includes means for storing cells from said cell sub-streams in a plurality of buffers.

44. A system according to claim 43, wherein said re-constructing means includes means for releasing cells stored in said buffers at a rate sufficient to maintain a predetermined number of stored cells within said buffers.

45. A system according to claim 44, wherein said second assembly includes means for flushing from said buffers all cells aligned in the same frame for all cell sub-streams upon failure to identify an unknown cell within at least one such frame.

46. A system according to claim 44, wherein said plurality of buffers are circular buffers.

47. A system according to claim 46, wherein, for each circular buffer, said second assembly includes:

(i) a write pointer which is incremented upon storage of an incoming cell into a corresponding buffer;

(ii) a read pointer which is incremented each time a cell is released from the corresponding buffer;

(iii) a total cells counter which is incremented each time the write pointer is incremented for the corresponding buffer and decremented each time the read pointer is incremented for the corresponding buffer; and (iv) a payload cell counter which is incremented each time a payload cell is stored in the circular buffer and decremented each time a payload cell is released from the corresponding buffer.

48. A system according to claim 33, wherein said first assembly includes means for inserting said sets of cell location information into framing cells at least one frame before frames for ones of said cell sub-streams corresponding to said sets of cell location information.

49. A system according to claim 33, wherein said first assembly includes means for inserting said sets of cell location information into framing cells at least one frame after frames for ones of said cell sub-streams corresponding to said sets of cell location information.

50. A system according to claim 33, wherein said first assembly includes means for inserting said sets of cell location information only into corresponding ones of said cell sub-streams.

51. A system according to claim 33, wherein said first assembly is couplable to a first asynchronous transfer mode (ATM) layer device and a plurality of first physical layer devices coupled to said physical links, and wherein said second assembly is couplable to a second ATM layer device and a plurality of second physical layer devices coupled to said physical links.

52. An apparatus for robustly re-combining a plurality of distributed cell sub-streams into a sequenced cell stream, the apparatus comprising:

means for receiving sets of cell location information corresponding to transmitted cell sub-streams; and means for robustly re-constructing an ordered sequence of cells from said transmitted cell sub-streams including means for decoding said sets of cell location information to identify and locate errored cells and missing cells within said transmitted cell sub-streams and means for demultiplexing and releasing error-free payload cells from said transmitted cell sub-streams.

53. A method of robustly re-combining a plurality of distributed cell sub-streams into a sequenced cell stream, the method comprising the steps of:

receiving sets of cell location information corresponding to transmitted cell sub-streams; and robustly re-constructing an ordered sequence of cells from said transmitted cell sub-streams by decoding said sets of cell location information to identify and locate errored cells and missing cells within said transmitted cell sub-streams and demultiplexing and releasing error-free payload cells from said transmitted cell sub-streams.

* * * * *